(12) United States Patent
Henry et al.

(10) Patent No.: US 10,887,822 B2
(45) Date of Patent: Jan. 5, 2021

(54) DYNAMIC MULTI-SIZE RADIO CLUSTERING USING RF CONSTELLATION

(71) Applicant: Cisco Technology, Inc., San Jose, CA (US)

(72) Inventors: Jerome Henry, Pittsboro, NC (US); Vishal S. Desai, San Jose, CA (US); Pooya Monajemi, Irvine, CA (US); James F. Florwick, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 16/136,061

(22) Filed: Sep. 19, 2018

(65) Prior Publication Data

US 2020/0092793 A1 Mar. 19, 2020

(51) Int. Cl.
*H04W 40/32* (2009.01)
*H04W 72/12* (2009.01)
*H04W 16/18* (2009.01)
*H04B 17/318* (2015.01)
*H04W 24/02* (2009.01)

(52) U.S. Cl.
CPC .......... *H04W 40/32* (2013.01); *H04B 17/318* (2015.01); *H04W 16/18* (2013.01); *H04W 24/02* (2013.01); *H04W 72/12* (2013.01)

(58) Field of Classification Search
CPC ..... H04W 40/32; H04W 16/18; H04W 24/02; H04W 72/12; H04B 17/318
USPC ........................................................ 370/329
See application file for complete search history.

(56) References Cited

U.S. PATENT DOCUMENTS

| | | | | |
|---|---|---|---|---|
| 9,673,515 | B2 * | 6/2017 | Crowley | .................. H01Q 1/40 |
| 2010/0141483 | A1 * | 6/2010 | Thacher | ............... G05D 1/0272 |
| | | | | 340/989 |
| 2014/0204841 | A1 * | 7/2014 | Ruiz Delgado | ...... H04B 7/0456 |
| | | | | 370/328 |
| 2018/0045821 | A1 * | 2/2018 | Lee | .................... H04W 72/1278 |
| 2018/0048349 | A1 * | 2/2018 | Sun | .................... H04W 72/0466 |
| 2018/0338324 | A1 * | 11/2018 | Kela | ...................... H04L 5/0037 |
| 2019/0007079 | A1 * | 1/2019 | Zhang | .................. H04B 1/1027 |
| 2019/0028318 | A1 * | 1/2019 | Chakraborty | ......... H04L 1/0054 |
| 2019/0149199 | A1 * | 5/2019 | Ferrante | .............. H04L 25/0228 |
| | | | | 375/267 |
| 2019/0349224 | A1 * | 11/2019 | Chiskis | ..................... H04B 3/32 |
| 2019/0372710 | A1 * | 12/2019 | Chen | ..................... H04W 72/04 |

OTHER PUBLICATIONS

RF Management 802.11a and 802.11g RF Management Profiles [Accessed Online] <https://www.arubanetworks.com/techdocs/ArubaOS_63_Web_Help/Content/ArubaFrameStyles/AP_Config/RF_Management.htm>.

(Continued)

*Primary Examiner* — Christopher R Crompton
(74) *Attorney, Agent, or Firm* — Patterson + Sheridan, LLP

(57) ABSTRACT

Techniques for assigning APs to wireless network controllers are described. One or more RF constellations for a plurality of APs in a wireless network are generated. The RF constellations are organized based on estimated RF distances among the plurality of APs. The plurality of APs are clustered into a plurality of groups of one or more APs, based on the RF constellations and the estimated RF distances. Each group, of the plurality of groups, is assigned to a wireless network controller.

20 Claims, 11 Drawing Sheets

(56) References Cited

OTHER PUBLICATIONS

Aerohiive Networks, "Cooperative Control Wireless LAN Architecture," 52 pages, 2012.
Radio Resource Management White Paper, RF Grouping, 18 pages.
Huawei Technologies Co., LTD, "WLAN High-Density Coverage Technology White Paper," 23 pages, 2014.

\* cited by examiner

DYNAMIC MULTI-SIZE RADIO CLUSTERING USING RF CONSTELLATION

TECHNICAL FIELD

Embodiments presented in this disclosure generally relate to controlling network Access Points (APs) in communication networks. More specifically, though not exclusively, embodiments disclosed herein relate to dynamically clustering APs based on radio frequency (RF) constellations.

BACKGROUND

Many wireless communication networks use one or more controllers to manage APs in the network. For example, one or more Wireless Local Area Network (LAN) Controllers (WLCs) can be used to manage various RF properties of the network, including the AP channels, AP transmit power, etc. In some cases, the controller(s) can optimize various RF properties for APs in an RF neighborhood. As one example, a controller (or group of controllers working together) can iteratively compare RF properties of one AP to the RF properties of other nearby APs, and use these comparisons to change and optimize the RF properties of the APs.

But as the size of the RF domain (e.g., the number of radios in a given RF group) increases, so does the complexity of coordinating power and channels. To address this, some vendors set a maximum complexity limit beyond which a given group cannot scale. For example, a vendor could set a limit of 1000 APs and 20 controllers in a group. Beyond this max number of APs, coordination of RF properties may not work. This can be a problem for large wireless deployments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
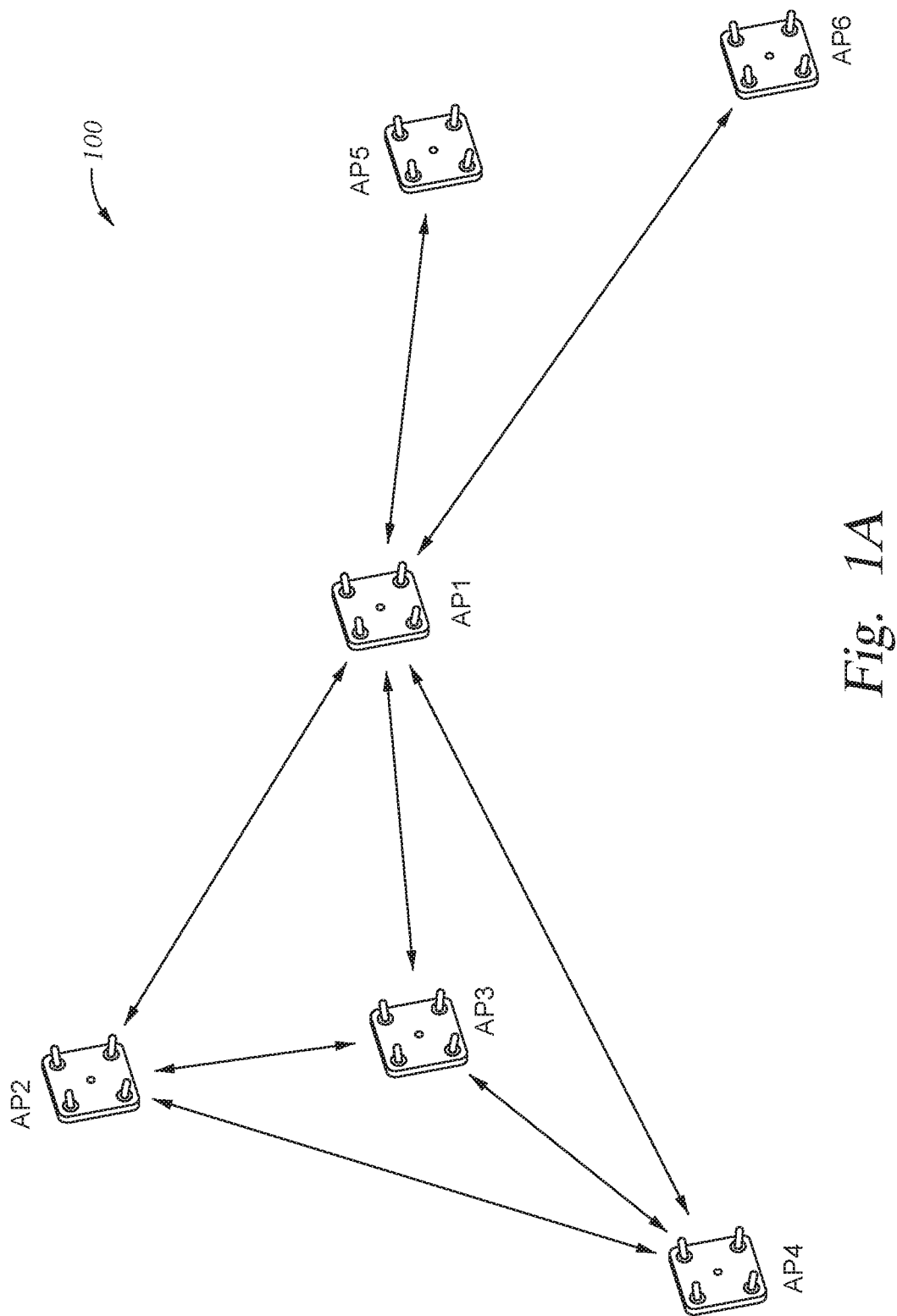
FIGS. 1A-C illustrate dynamically clustering APs based on RF constellations, according to one embodiment described herein

Embodiments described herein include a method of assigning APs to wireless network controllers. The method includes generating one or more RF constellations for a plurality of APs in a wireless network. The RF constellations are organized based on estimated RF distances among the plurality of APs. The method further includes clustering, based on the RF constellations and the estimated RF distances, the plurality of APs into a plurality of groups of one or more APs. The method further includes assigning each group, of the plurality of groups, to a wireless network controller.

Embodiments described herein further include a system. The system includes a processor and a memory storing a program, which, when executed on the processor, performs an operation. The operation includes generating one or more RF constellations for a plurality of APs in a wireless network. The RF constellations are organized based on estimated RF distances among the plurality of APs. The operation further includes clustering, based on the RF constellations and the estimated RF distances, the plurality of APs into a plurality of groups of one or more APs. The operation further includes assigning each group, of the plurality of groups, to a wireless network controller.

Embodiments described herein further include computer program product for assigning APs to wireless network controllers. The computer program product includes a computer-readable storage medium having computer-readable program code embodied therewith, the computer-readable program code executable by one or more computer processors to perform an operation. The operation includes generating one or more RF constellations for a plurality of APs in a wireless network. The RF constellations are organized based on estimated RF distances among the plurality of APs. The operation further includes clustering, based on the RF constellations and the estimated RF distances, the plurality of APs into a plurality of groups of one or more APs. The operation further includes assigning each group, of the plurality of groups, to a wireless network controller.

Example Embodiments

As discussed above, coordinating relatively large groups of APs in RF neighborhoods can be very challenging. In a wireless network based on discrete groups, where no location would expect more than an upper limit of APs in range of one another, this may not be a problem. In an embodiment, in this scenario controllers can create sub-groups of APs in which the APs in each group are within range of each other, but are not within range of other groups of APs.

As AP density increases, however, creating isolated groups may be impossible. Today, a WLAN Controller can support thousands of APs that can cover a small city with a blanket of contiguous wireless network coverage. A deployment encompassing these access points can manifest various levels of RF densities and therefore, RF grouping mechanisms that put all APs under one controller (or a group of controllers) face scale challenges, with multiple adjoined sites resulting in a continuous RF neighborhood. For example, public venues like large stadiums, convention centers, or conference centers can include such a wireless deployment. In this type of deployment, the RF domain is contiguous. Each AP can hear some others, and there is no clear point where an RF network boundary should be set.

Techniques disclosed herein address this problem through dynamic RF clustering that is aware of RF presence between the APs. That way, small sets of collocated APs that reside in the same RF space can form localized RF clusters on which RF optimizations can be performed. In order to prevent cascading effects due to subsector optimization, the clustering algorithms maintain tradeoffs between including too many neighboring access points and neglecting strong RF neighbors that should be included in optimizations. In one or more embodiments disclosed herein this can be achieved by automatically creating an AP constellation, organized by respective RF distance, and then dynamically clustering the APs based on their RF proximity in the constellation. This also allows for the allocation of groups to different controllers so as to share the RF optimization computing load across multiple units, while still allowing for optimization of the deployment as a whole.

FIG. 1A illustrates a wireless network deployment with multiple APs, according to one embodiment described herein. As illustrated in FIG. 1A, a wireless network deployment 100 includes six APs. Each AP has several neighbors, with which it is within wireless range. For example, AP1 has five neighbors: AP2, AP3, AP4, AP5, and AP5. AP2 has three neighbors: AP1, AP2, and AP4. AP3 has three neighbors: AP1, AP2, and AP4. AP4 also has three neighbors: AP1, AP2, and AP3. AP 5 has two neighbors: AP1 and AP6. And AP6 also has two neighbors: AP1 and AP5.

Figure 1B:
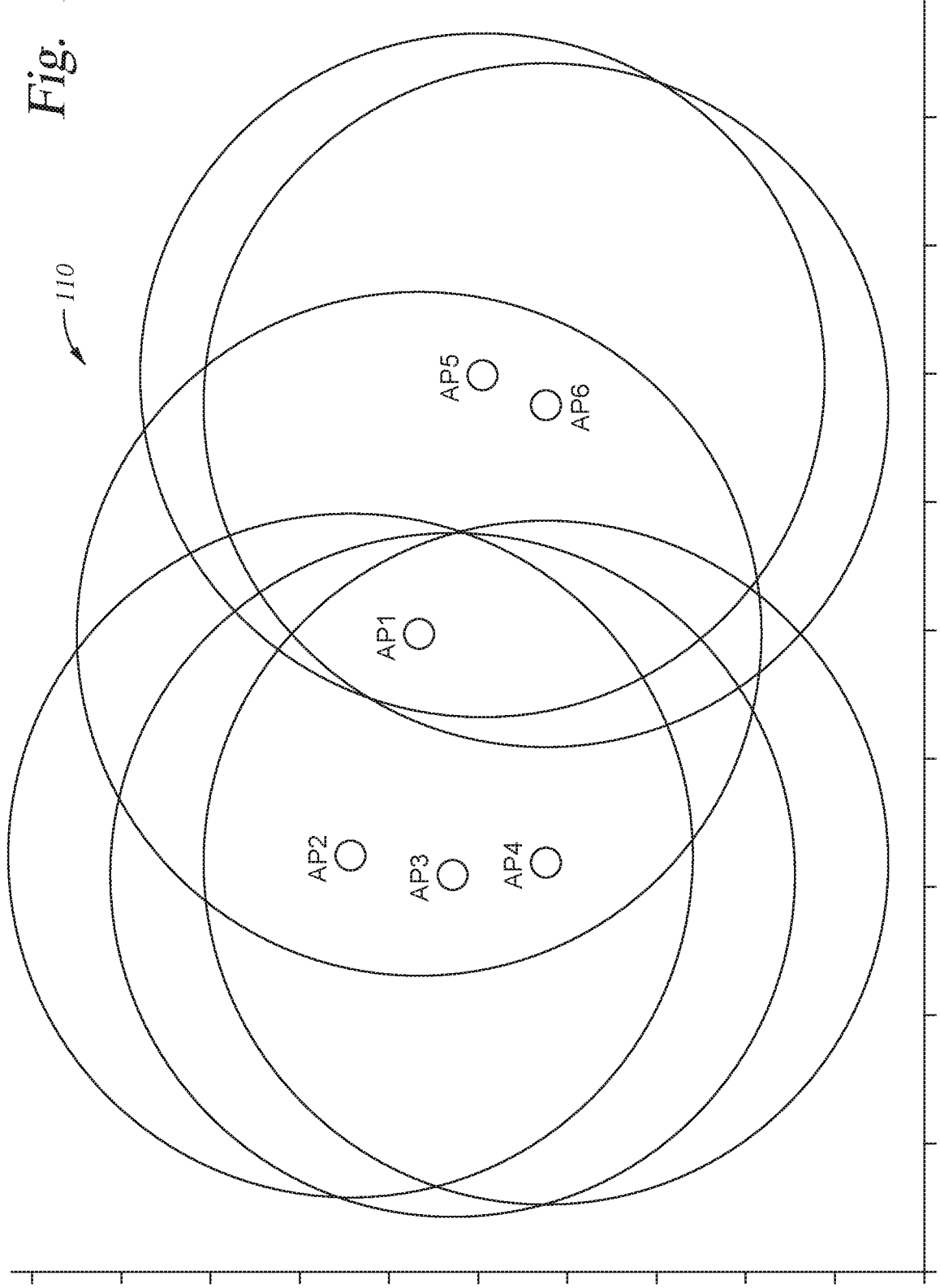

FIG. 1B illustrates an RF constellation 110 for these six APs. As illustrated, each AP has its own constellation, represented by the circle with that AP in its center. These constellations are combined, as illustrated in FIG. 1B. Generating an RF constellation is discussed further with regard to FIGS. 3-8, below.

Figure 1C:
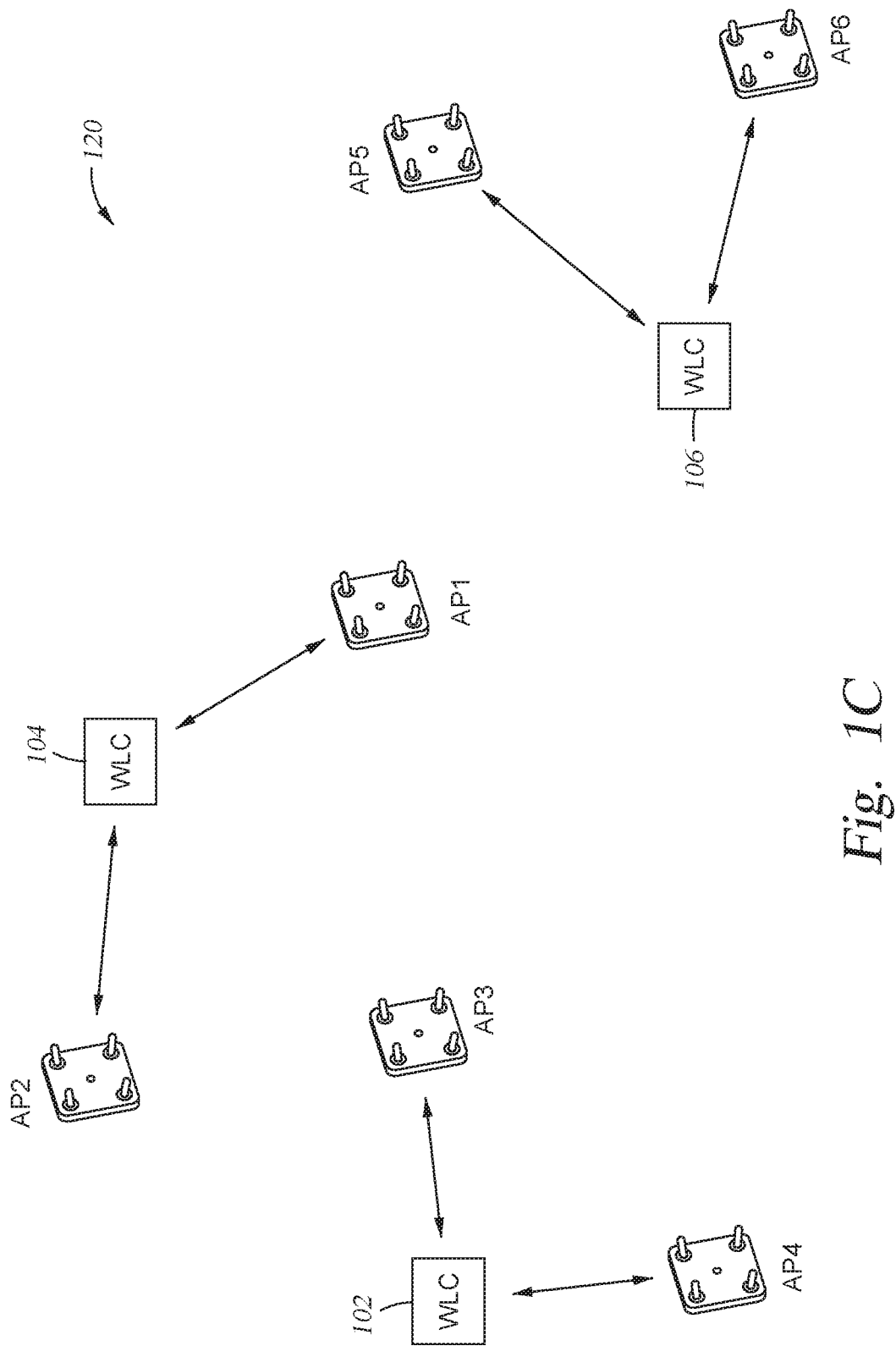

FIG. 1C illustrates a wireless deployment 120 including these six APs and three WLCs (102, 104, and 106) to coordinate the APs. In an embodiment, and as discussed further below, the constellation illustrated in FIG. 1B can be used to cluster APs and assign the APs to WLCs. As discussed above, the RF domain is contiguous. Each AP can hear some others, and there is no clear point where an RF network boundary should be set. For example, AP1 can have IP reachability to all three WLCs, allowing it to be managed by any of the WLCs, and AP1 can be within wireless radio range of the other five APs. Thus, it can be challenging to determine how the APs should be grouped, and which WLC should be used to manage which APs. One or more embodiments herein disclose techniques to identify clusters of APs and solve this problem. As illustrated in FIG. 1C, AP1 is grouped with AP2, using the constellation 110, and assigned to WLC 104. In an embodiment, WLC 104 is connected with AP1 and AP2 using a wired connection. Alternatively, WLC 104 can be connected with AP1 and AP2 using a wireless connection, or any other suitable connection.

Figure 2:
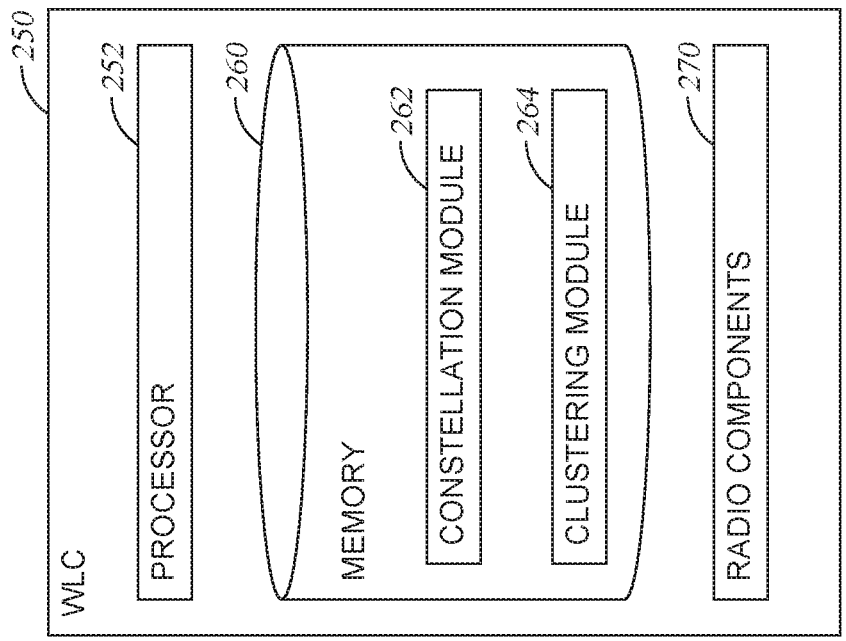
FIG. 2 illustrates an AP and WLC, according to one embodiment described herein.
Figure 2:
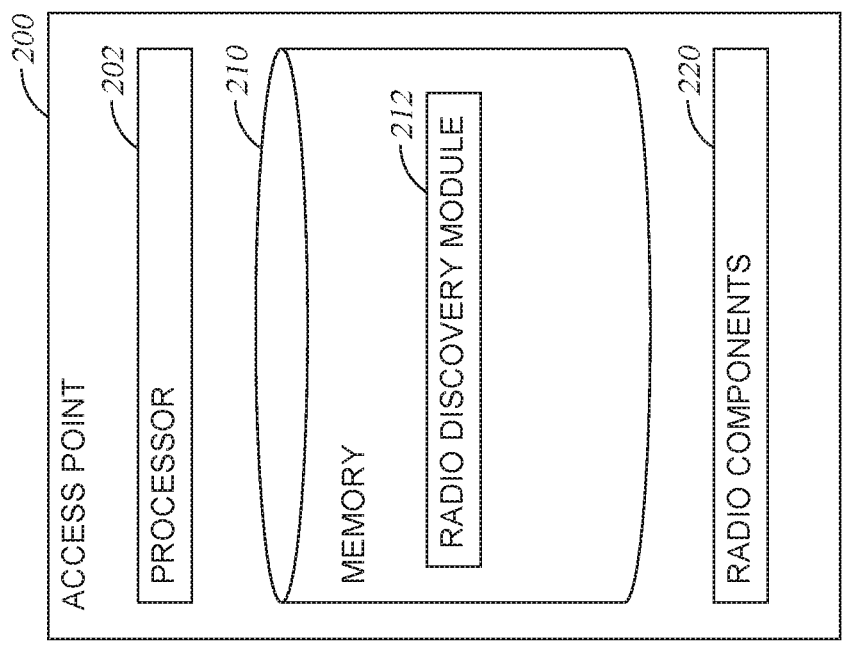

FIG. 2 illustrates an AP 200 and a WLC 250, according to one embodiment described herein. The AP 200 includes a processor 202, a memory 210, and radio components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The radio components 220 include the components necessary for the AP to act as an Access Point in a wireless network. For example, the radio components 220 can includes two radios, where the first radio is a dedicated 5 GHz radio that transmits signals in the 5 GHz frequency band and the second radio is a XOR radio that can dynamically switch between the 2.4 GHz and 5 GHz frequency bands. That is, the second radio can transmit signals in either the 2.4 GHz frequency band or the 5 GHz frequency band. The two radios in an AP can be active simultaneously on the same frequency band or on different frequency bands. For example, the XOR radio and the dedicated 5 GHz radio in an AP can simultaneously transmit signals in the 5 GHz frequency band by using different channels of the 5 GHz frequency band.

Although memory 210 is shown as a single entity, memory 210 may include one or more memory devices having blocks of memory associated with physical addresses, such as random access memory (RAM), read only memory (ROM), flash memory or other types of volatile and/or non-volatile memory. The memory 210 generally includes program code for performing various functions related to use of the AP. The program code is generally described as various functional "applications" or "modules" within the memory 210, although alternate implementations may have different functions and/or combinations of functions. Within the memory 210, the radio discovery module 212 is generally configured to identify nearby APs as part of generating an RF constellation.

The WLC 250 includes a processor 252, a memory 260, and radio components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

Although memory 260 is shown as a single entity, memory 260 may include one or more memory devices having blocks of memory associated with physical addresses, such as random access memory (RAM), read only memory (ROM), flash memory or other types of volatile and/or non-volatile memory. The memory 260 generally includes program code for performing various functions related to use of the AP. The program code is generally described as various functional "applications" or "modules" within the memory 260, although alternate implementations may have different functions and/or combinations of functions.

Within the memory 260, the constellation module 262 generates RF constellations of APs. The clustering module 264 clusters APs based on the constellations. In an embodiment, the constellation module 262, the clustering module 264, or both, can be implemented in an AP (e.g., stored in the memory 210 for execution by the processor 202) or in another suitable network component. For example, the constellation module 262, the clustering module 264, or both can be implemented in any component that receives RF information from the APs. Implementing the constellation module 262 and the clustering module 264 in a WLC 250 is merely one example embodiment.

The radio components 270 include the components necessary for the WLC to communicate with APs and other network components.

Figure 3:
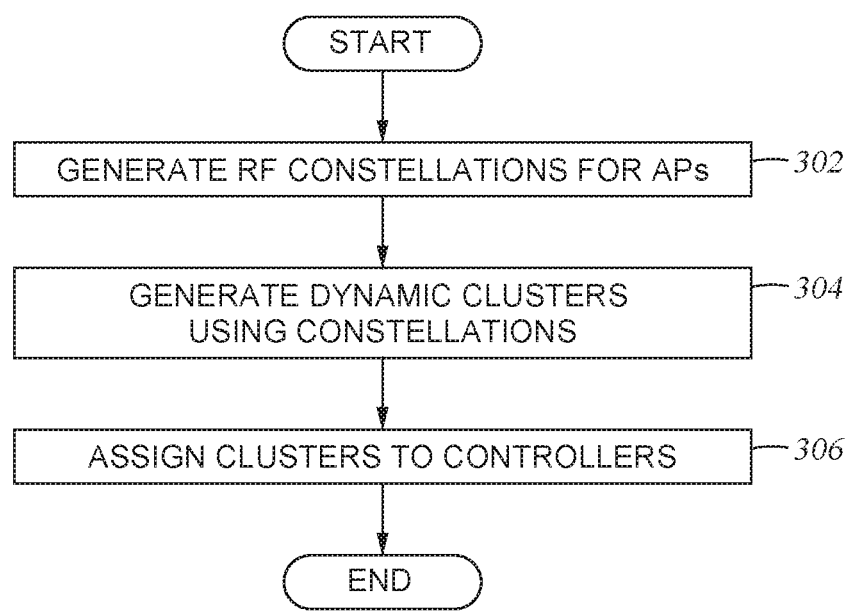
FIG. 3 is a flowchart illustrating dynamically clustering APs based on RF constellations, according to one embodiment described herein.

FIG. 3 is a flowchart illustrating dynamically clustering APs based on RF constellations, according to one embodiment described herein. At block 302 a constellation module (e.g., the constellation module 262 illustrated in FIG. 2) generates RF constellations for APs. For example, the constellation module can use communication between APs to identify proximities between the APs and generate RF constellations of APs. This is illustrated in FIG. 4, and discussed further in relation to FIGS. 4-9.

At block 304, a clustering module (e.g., the clustering module 264 illustrated in FIG. 2) generates dynamic clusters using constellations (e.g., the RF constellations generated at block 302. This is illustrated further with regard to FIG. 9. At block 306, the clustering module assigns clusters (e.g., the clusters generated at block 304) to controllers (e.g., WLCs) in the network. In an embodiment, different WLCs in the network can have different computing capabilities, and can therefore be suitable to manage different numbers of APs. In an embodiment, at block 306 the clustering module takes this into account and assigns clusters to WLCs suitable for managing the cluster.

Figure 4:
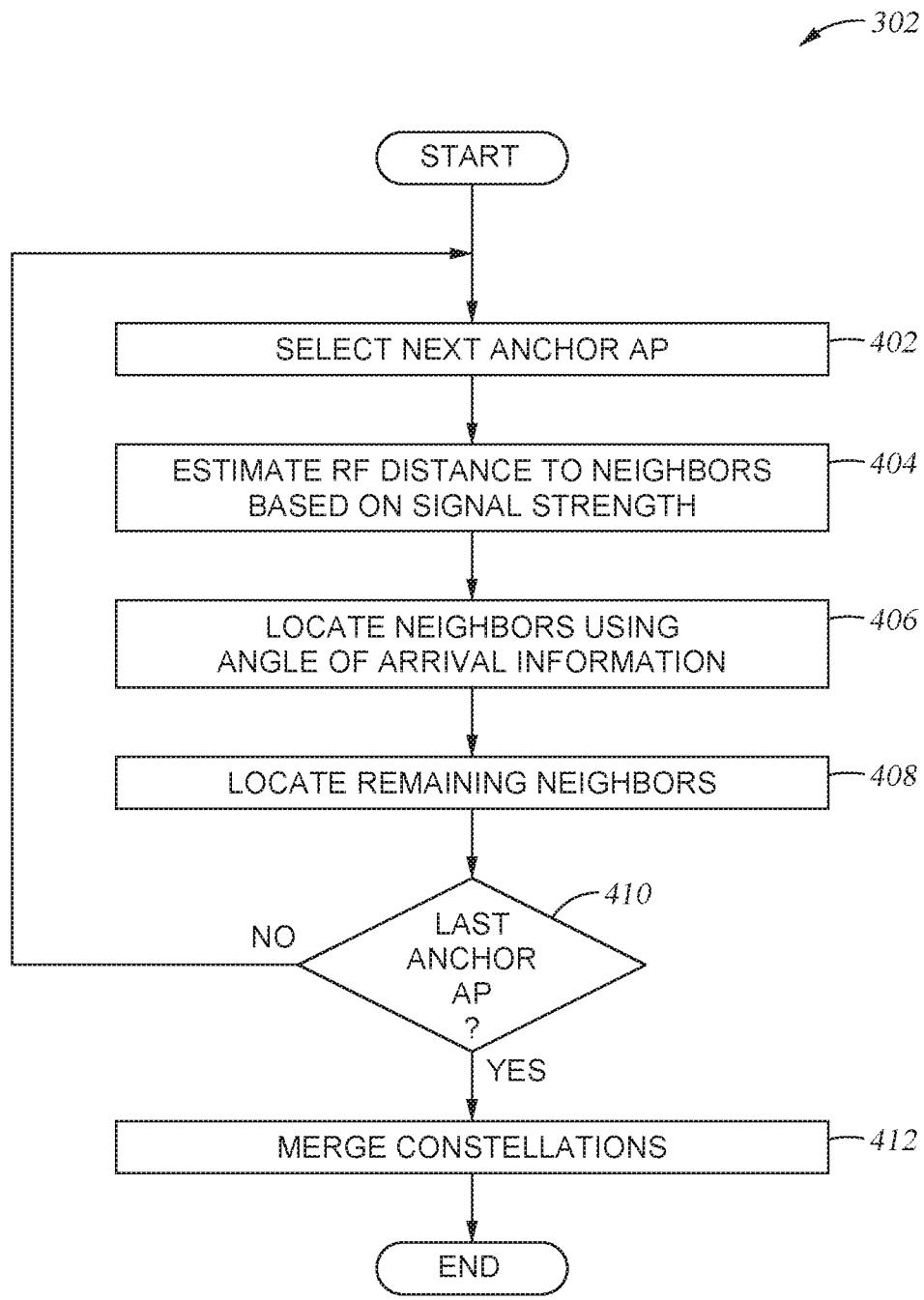
FIG. 4 is a flowchart illustrating generating RF constellations for APs, according to one embodiment described herein.

FIG. 4 is a flowchart illustrating generating RF constellations for APs, according to one embodiment described herein. In an embodiment, FIG. 4 corresponds with block 302 illustrated in FIG. 3. At block 402, a constellation module (e.g., the constellation module 262 illustrated in FIG. 2) selects the next anchor AP for an RF constellation. In an embodiment, the constellation module can select anchor APs from among APs that reside in highly dense RF neighborhoods with many symmetrical RF relationships (e.g., the APs with the top n neighbors). In an embodiment, the constellation module selects anchor APs dynamically. In another embodiment, another module or a system administrator selects the anchor APs.

At block 404, the constellation module estimates the RF distance of the selected anchor AP to its neighbors based on RF signal level. In an embodiment, an AP can learn about its RF neighbors (e.g., APs within RF communication distance) through neighbor messages. For example, some wireless networks APs are configured to send neighbor discovery messages to facilitate this knowledge. In other networks, beacons or messages resulting from each AP's normal activity are used. The discussion related to block 404 focuses on the use of neighbor discovery messages, but any other suitable discovery technique can be used.

In an embodiment, a radio discovery module (e.g., the radio discovery module 212 in FIG. 2) uses an RF signal metric (e.g., a received signal strength indicator (RSSI)). For example, the radio discovery module can use the inverse of a modified okumura-hata radio propagation model to translate the RSSI of the received message into an RF distance estimate. In an embodiment, the radio discovery module can perform reverse path loss to determine this RF distance estimate. Alternatively, the distance estimate may be determined using other data sources instead of (or in addition to) RSSI, for example RF signal-to-noise ratio (SNR).

At block 406 the radio discovery module in the anchor AP locates neighbors using angle of arrival (AoA) information. In some circumstances, AoA information is available for the discovery message received at the anchor AP from the neighboring AP. If AoA information is available, the constellation module can combine this information with the RF distance estimate and use it to locate the neighboring AP. The neighboring AP is then marked or saved as fully located (e.g., in a table or database stored in the anchor AP, in a WLC, or in another suitable location), meaning that further location processing (e.g., the trilateration techniques discussed below) is not necessary for that neighboring AP.

At block 408, the radio discovery module in the anchor AP locates the remaining neighbors (e.g., neighbors for which AoA information is not available). In an embodiment, the radio discovery module does this using trilateration techniques. This is discussed further with regard to FIGS. 5 and 6, below.

While techniques disclosed herein can provide for generally accurate RF constellations of APs, as RF distance increases between APs, the accuracy of the relative distance and position determination can decrease. According to one or more techniques disclosed herein, however, this effect is limited for APs with a higher number of neighbors (as this provides more reference points to compute from). Thus, the less accurate estimates are likely to occur for APs with a relatively low number of neighbors—but the cluster to which these APs should be assigned is likely to be less ambiguous (since they have relatively fewer neighbors), and so the less accurate constellation estimates should not affect the eventual clustering.

At block 410, the constellation module determines whether the last anchor AP has been analyzed. If not, the flow returns to block 402 and the constellation module selects the next anchor AP. If so, the constellation module merges the constellations from the various anchor APs.

In an embodiment, after block 410 the constellation module has generated a constellation for each selected anchor APs. But the constellation module has not determined the relative locations and distances between these constellations. In an embodiment, the constellation module does this by first identifying shared APs across constellations and merging the constellations in 2-D space. The constellation module then constructs the distance between non-neighboring APs (e.g., across constellations) in 2-D space. This can be done by identifying paths between APs using intermediate, neighboring APs. This is discussed further in relation to FIG. 8.

Figure 5:
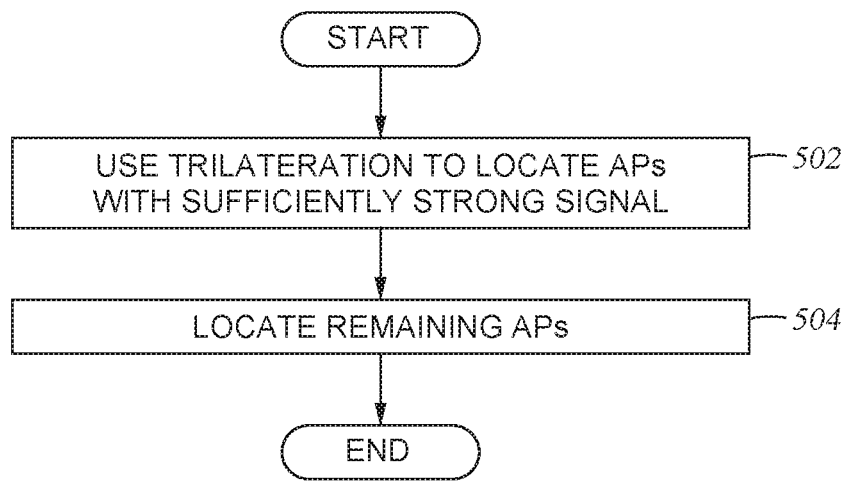
FIG. 5 is a flowchart illustrating locating remaining neighbors while generating RF constellations for APs, according to one embodiment described herein.

FIG. 5 is a flowchart illustrating locating remaining neighbors while generating RF constellations for APs, according to one embodiment described herein. In an embodiment, FIG. 5 corresponds with block 408 illustrated in FIG. 4. At block 502, a radio discovery module in the anchor AP (e.g., the radio discovery module 212 illustrated in FIG. 2) uses trilateration to locate neighboring APs with sufficiently strong signal to the anchor AP. For example, the radio discovery module can use trilateration for neighboring APs with an RF signal metric above a threshold. This is discussed further with regard to FIG. 6.

At block 504, a constellation module (e.g., the constellation module 262 illustrated in FIG. 2) uses further techniques to reduce the error when locating remaining APs (e.g., APs for which the signal strength is too low for reliable trilateration). In an embodiment, locations of a group of neighbors together can be used to provide a more accurate estimate of the distance from an anchor AP to an AP with a relatively weak RF signal metric. In an embodiment, the constellation module utilizes previously located nearby APs as anchor APs to locate the remaining neighbors.

For example, the constellation module can identify a number of candidate positions for each un-located AP. Where AoA is available but distance is unreliable, this set will be located on a line moving radially outwards from the candidate AP at the measured angle of arrival. Where AoA is not available but a distance estimate is available, this set will be located on a circle surrounding the candidate AP at the estimated radius. For each set of given locations for the APs being located, a cost metric can be derived from a joint Gaussian distribution based on the distance difference among all neighbors. The variance can be derived from the absolute distance of the neighbor AP to the anchor AP (e.g., a closer distance results in a smaller likely error). The constellation module can then perform either a direct search or a gradient descent search among the possible locations to identify the likely location.

Figure 6:
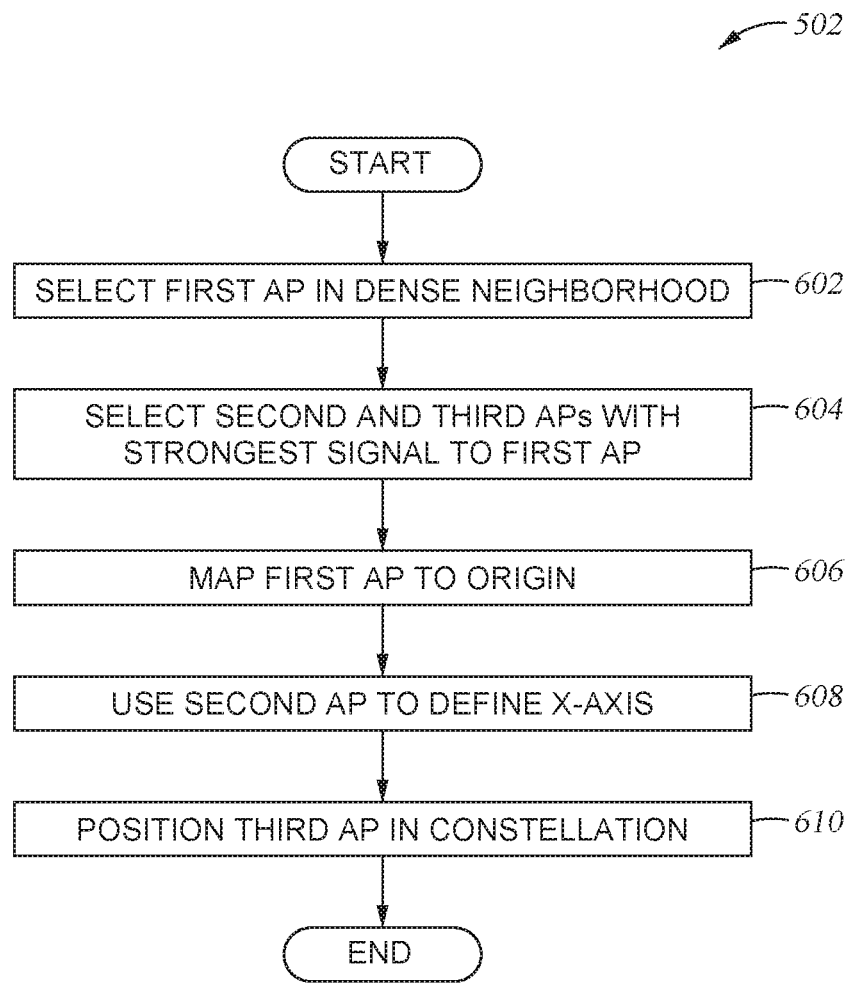
FIG. 6 is a flowchart illustrating using trilateration to locate neighboring APs for an RF constellation, according to one embodiment described herein.
Figure 7:
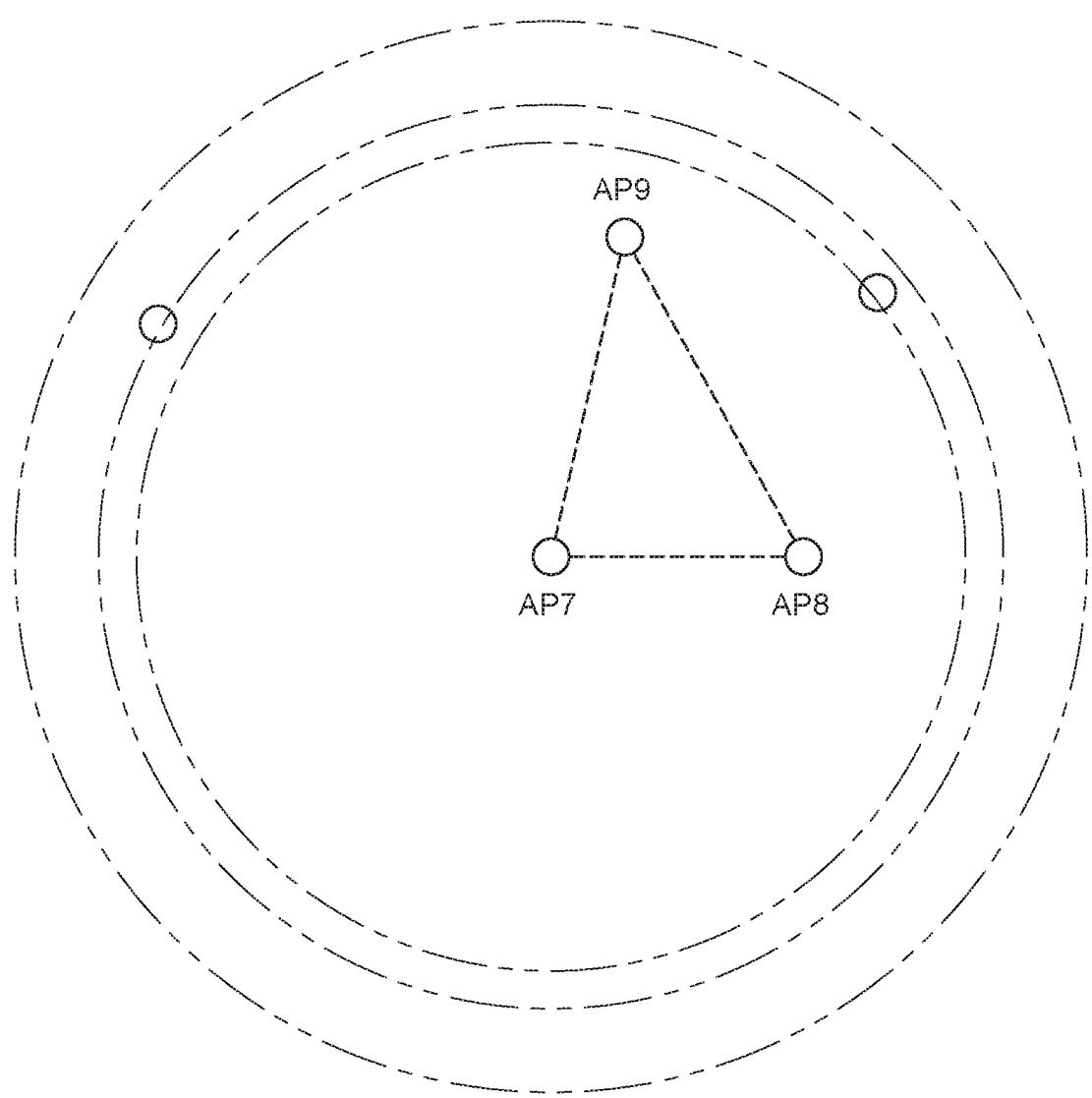
FIG. 7 illustrates using trilateration to locate neighboring APs for an RF constellation, according to one embodiment described herein.

FIGS. 6 and 7 illustrate using trilateration to locate neighboring APs for an RF constellation, according to one embodiment described herein. In an embodiment, FIGS. 6 and 7 correspond with block 502 illustrated in FIG. 5. For convenience, these figures will be discussed together.

At block 602, a constellation module (e.g., the constellation module 262 illustrated in FIG. 2) selects a first AP in a dense neighborhood (e.g., an AP with a relatively large number of neighbors). For example, the constellation module can select AP 7, illustrated in FIG. 7. At block 604, the constellation module selects second and third APs with the strongest signal to the first AP. For example, the constellation module can select AP8 and AP9 illustrated in FIG. 7.

At block 606, the constellation module maps the first AP to the origin of the constellation (e.g., the 0,0 point). This is illustrated in FIG. 7, where AP7 is shown at the origin of the constellation. At block 608, the constellation module uses the second AP (i.e., the AP with the strongest signal to the first AP) to define the x-axis of the constellation. This is illustrated in FIG. 7, where AP8 has the strongest signal to AP7 and therefore defines the x-axis of the constellation. At block 610, the constellation module positions the third AP in the constellation based on distance estimates between the third AP and the other two APs. This is illustrated in FIG. 7, where AP9 is positioned in the constellation based on its estimated distance from AP7 and AP8.

Figure 8:
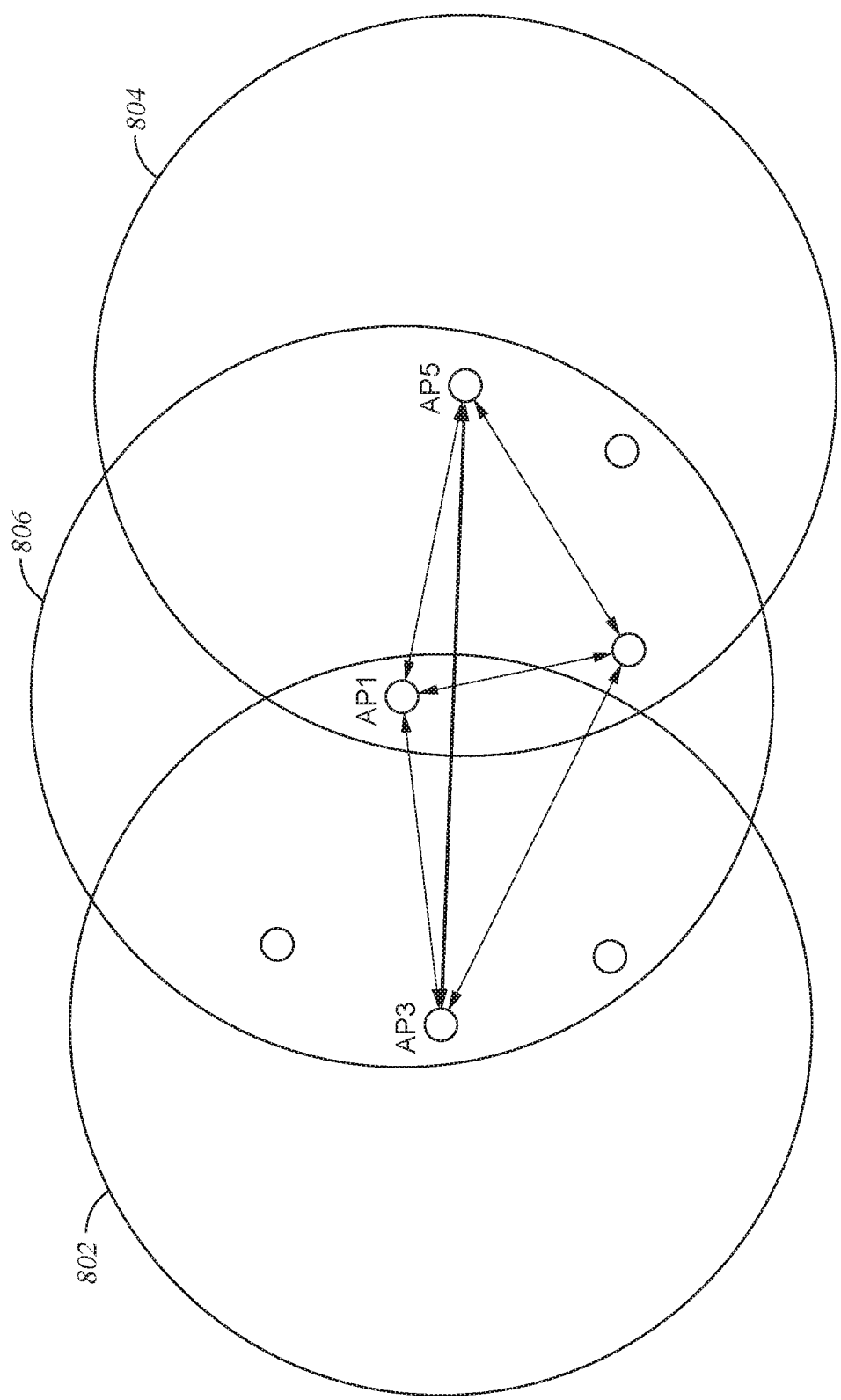
FIG. 8 illustrates a merged RF constellation, according to one embodiment described herein.

FIG. 8 illustrates a merged RF constellation, according to one embodiment described herein. In an embodiment, the techniques illustrated in FIG. 8 can be used when merging individual constellations, as discussed above with regard to block 412 in FIG. 4. FIG. 8 illustrates three constellations, a constellation 802 in which AP3 is the anchor AP located at the origin, a constellation 804 in which AP5 is the anchor AP located at the origin, and a constellation 806 in which AP1 is the anchor AP located at the origin.

In an embodiment, a constellation module (e.g., the constellation module 262 illustrated in FIG. 2) determines that AP1 is shared across each constellation and initially merges constellations 802, 804, and 806 based on this shared AP. In an embodiment, the constellation module then determines the distance between AP3 and AP5, which are not neighbors, in order to estimate the relative locations of constellations 802 and 804.

In an embodiment, the constellation module finds the shortest piece-wise path of neighborhoods that connects the two APs. For example, since AP3 and AP5 are not neighbors, the piecewise path may be AP3→AP1→AP5, each of which are neighbors. If no such path exists, then the distance between AP3 and AP5 is assumed to be infinite. For each AP in the middle (e.g., AP1), the constellation (e.g., the constellation 806) is super-imposed on the neighboring AP's constellations. After the completion of the constellation super-imposition process, a piecewise linear shape is formed that connects the two APs (AP3 and AP5). The constellation module can then compute the shape of this piecewise-linear connection, and can use that to deduce the direct distance between the end points AP3 and AP5.

Figure 9:
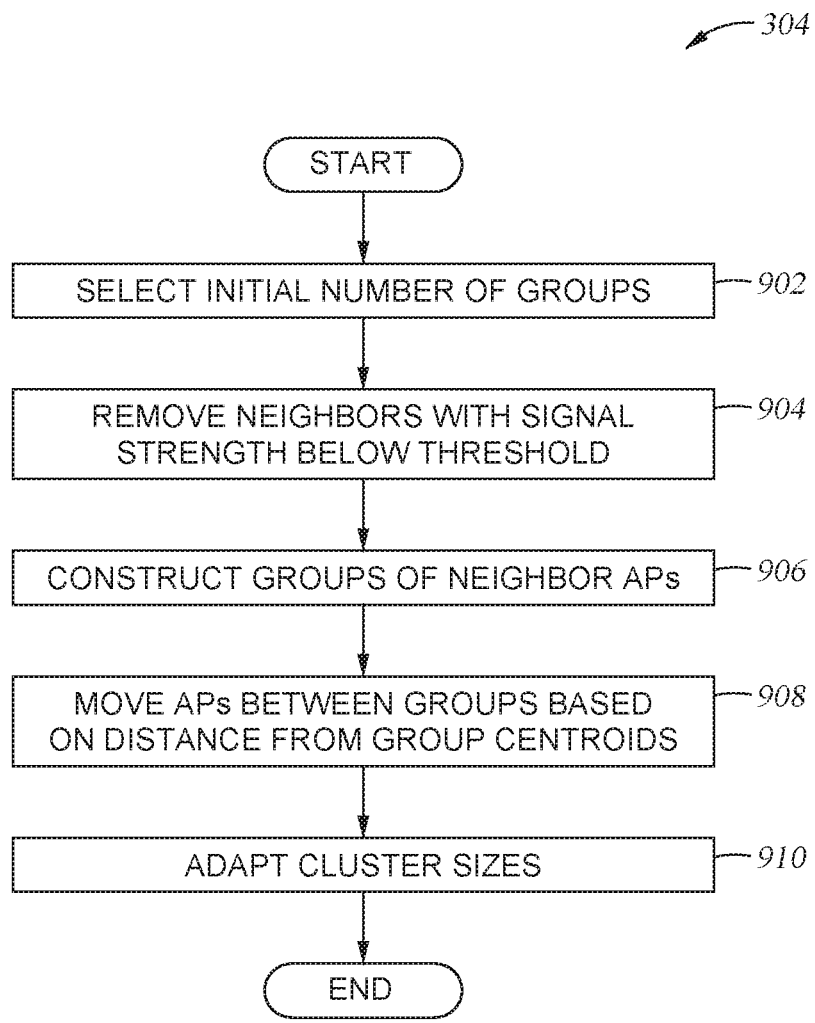
FIG. 9 illustrates generating dynamic clusters of APs using RF constellations, according to one embodiment described herein.

FIG. 9 illustrates generating dynamic clusters of APs using RF constellations, according to one embodiment described. In an embodiment, FIG. 9 corresponds with block 304, illustrated in FIG. 3. In an embodiment, the constellation of APs organized by their respective differences can be used to group the APs into smaller clusters. In an embodiment, clusters are determined by APs of closest relative RF distance. This allows moving from a large neighborhood into smaller (manageable) groups.

In an embodiment, the cluster size can be determined based on a computing constraint to be put to the system. For example, a system administrator (or a dynamic system component) can determine that clustering should attempt to limit the number of APs in a group to a limit (e.g., 800), or to a range (e.g., 400 to 800 APs). If the number of APs across WLCs in a given RF domain exceeds the limit, the clustering algorithm is triggered to create two groups of less than the maximum number of allowed APs (and more than the minimum, if a range is used). In another embodiment, a clustering module (e.g., the clustering module 264 illustrated in FIG. 2) can decide to create as many clusters as there are WLCs in the RF group. For example, a continuous group of 2400 APs spread across 3 WLCs could be divided into 3 clusters, one cluster being allocated to each WLC.

In an embodiment, the cluster determination attempts to find groups of APs with the lowest RF boundary region. In this embodiment, the number of APs in each group may be different. In another embodiment, the cluster determination attempts to create groups of equal sizes (e.g. 3 groups of 800 APs), so as to spread the computing load equally. In another embodiment, the cluster determination creates groups of APs with the lowest RF boundary region, but also limits the cluster size based on the target supporting WLC capabilities. In an embodiment, some WLCs may have more computing capabilities than others, and may therefore be able to handle coordination of more APs.

For example, consider 2400 APs spread across three WLCs (two powerful models and one relatively weaker model of WLC). The clustering module could be configured allocate 1000 APs to each of the more powerful WLC platforms and 400 to the less powerful WLC platform, based on capability weights allocated by the vendor, the administrator, or any other entity. Any variation around these three embodiments is possible. It should also be noted that, for all embodiments, the number of APs allocated to each WLC does not need be a strict number, but can be a range, as explained above, in order to find the best group boundary within a range of APs.

At block 902, a clustering module (e.g., the clustering module 264 illustrated in FIG. 2) selects the initial number of groups. In an embodiment, this can be based on the logic discussed above. For example, the clustering module could determine that 2400 APs across three WLCs should generate three groups of APs.

At block 904, the clustering module removes neighbors with a signal strength below a threshold. As discussed above in relation to FIGS. 3-8, generating the constellations creates AP neighbor distance references, based on an RF signal metric (e.g., RSSI or SNR). Each AP is then represented on a 2-D plane with a set of coordinates (R,S), as illustrated in FIG. 1B. The clustering module can set a threshold below which a detected neighbor for a given AP is ignored (e.g., a neighbor farther than x RF distance away is ignored).

At block 906, the clustering module constructs groups of neighboring AP. In an embodiment, the clustering module picks an AP for each initial group—for example, if three groups are selected at block 902, the clustering module can select three APs. In an embodiment, the clustering module selects these APs at random. Alternatively, the clustering module selects the APs with largest number of neighbors.

The clustering module then constructs a group of neighbors APs based on RF signal metric (e.g., RSSI) proximity. In an embodiment, the clustering module constructs a Voronoi diagram by initiating K cluster centroids. This can be represented by the equation $\mu_c^{(i)}\{\mu_1, \mu_2, \ldots, \mu_k,$ where $\mu_k \in \mathbb{R}^2\}$. For example, when three groups are desired, K would be three. Each AP ($x^i$) position is determined in the RF constellation, with its associated $R(x^i)$ and $S(x^i)$ coordinates (from the constellation) used to initialize $\mu_c^i$.

At block 908, the clustering module moves APs between groups based on the distance of the APs from the group centroid. In an embodiment, the clustering module determines the Euclidian distance of each $x^i$ from each group centroid. For each $x^i$, the clustering module chooses the cluster centroid at the smallest Euclidian distance. For example, let $c^{(i)}$ be the index of that nearest centroid $\mu_c^i$). Using multiple iterations, the clustering module determines the cluster centroid closest to each $x^i$. In an embodiment, this determination translates as a minimization function:

$$\min_{c^{(i)}} \Sigma_{i=1}^K \|x^i - \mu_{c^{(i)}}\|^2$$

Once the clustering module has associated each $x^i$ with the nearest $\mu_{c^i}$, the K cluster centroids are moved to the geometric center of the cluster formed by their associated $x^i$. For example, this can be done using the minimization function:

$$\min_\mu \Sigma_{i=1}^k \Sigma_{x \in c_i} \|x - \mu_i\|^2$$

The result of this iterative process is a set of clusters, with K groups of APs organized around their smallest RF distance. The techniques discussed above are merely one example implementation. Other techniques can be used instead of, or in addition, to these techniques to generate a set of clusters organized around RF distance.

If a specific number of clusters is desired, organized to minimize RF distances, the flow stops after block 908. Each resulting cluster could have a different number of participating APs. The boundary between groups is based on the largest RF distance between groups. In other words, each member of each group is close (from an RF standpoint) to the other members of the same group, but each group is far (from an RF standpoint) from the other groups and their members.

But as discussed above, the clustering can also be configured to generate clusters with the same number of APs in each cluster, or with the number of APs in each cluster configured for the capabilities of the WLCs. At block 910, the clustering module adapts cluster sizes to meet these requirements. For example, if each cluster is required to have a number of APs falling within a range (e.g., 400-800 APs in each cluster), the size of each cluster can be adjusted to meet this requirement.

For example, the clustering module can sort the clusters by the initially computed sizes. Then, for each cluster larger than the target final size, the clustering module can select each member of the cluster, and calculate the Euclidian distance to the cluster centroid. The clustering module can then build a heap, and compute the distance of each of the members above the target group population threshold to the next nearest cluster. The clustering module can swap one extra member to the next nearest cluster (based on the smallest sum of Euclidian distance to the current cluster and the neighboring cluster centroids), then re-compute the cluster. The clustering module can repeat this until the group reaches the target population number.

In addition, the techniques disclosed herein can be used to provide further functionality to the network controllers. For example, the controllers could be configured to compute RF properties in an order based on the constellation and clustering. For example, the controllers could be configured to first re-compute the channel and power plan for the cluster with the highest number of APs, the cluster associated to the WLC of highest capacity, or the cluster of smallest Euclidian diameter. The controllers could then exchange messages and re-compute the next group in line, which will in turn take into account the resulting first group RF results (e.g., the new RF map) to compute its own power/channel plan.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the constellation module 262 or the clustering module 264) or related data available in the cloud. For example, the constellation module or the clustering module could execute on a computing system in the cloud and generate the constellation and clusters for the APs.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of assigning access points (APs) to wireless network controllers, the method comprising:

generating a plurality of radio frequency (RF) constellations for a plurality of APs in a wireless network, the plurality of RF constellations organized based on estimated RF distances between the APs in the plurality of APs;

clustering, based on the plurality of RF constellations and the estimated RF distances, the plurality of APs into a plurality of groups of one or more APs; and assigning each group, of the plurality of groups, to a wireless network controller.

2. The method of claim 1, wherein each RF constellation of the plurality of RF constellations comprises a plurality of sets of coordinates representing a position of each AP included in the respective RF constellation.

3. The method of claim 1, wherein generating the plurality of RF constellations further comprises:

estimating an RF distance between a first AP, of the plurality of APs, and a second AP, of the plurality of APs, based on an RF signal metric between the first AP and the second AP.

4. The method of claim 3, wherein the RF signal metric is a received signal strength indicator (RSSI) relating to a neighbor discovery message transmitted between the first AP and the second AP.

5. The method of claim 3, wherein generating the plurality of RF constellations further comprises:
locating the first AP relative to the second AP based on the estimated RF distance between the first AP and the second AP and based on angle of arrival information for a radio signal received from the second AP at the first AP.

6. The method of claim 3, wherein generating the plurality of RF constellations further comprises:
locating the first AP relative to the second AP based on trilateration between the first AP, the second AP, and a third AP of the plurality of APs.

7. The method of claim 6, wherein trilateration between the first AP, the second AP, and the third AP further comprises:
mapping the first AP to an origin of a first RF constellation;
determining that a first RF signal metric between the first AP and the second AP is stronger than a second RF signal metric between the first AP and the third AP, and in response defining an x-axis of the first RF constellation using the second AP; and
positioning the third AP in the first RF constellation based on one or more distance estimates between the first AP and the third AP and between the second AP and the third AP.

8. The method of claim 1, wherein generating the plurality of RF constellations further comprises:
generating a first RF constellation relating to a first subset of the plurality of APs, the first RF constellation relating to a first anchor AP of the plurality of APs;
generating a second RF constellation relating to a second subset of the plurality of APs, the second RF constellation relating to a second anchor AP of the plurality of APs; and
combining the first RF constellation and the second RF constellation to generate a third RF constellation.

9. The method of claim 1, wherein clustering, based on the plurality of RF constellations and the estimated RF distances, the plurality of APs into a plurality of groups of one or more APs further comprises:
determining an initial number of groups of APs;
assigning a first AP of the plurality of APs to a first group, of the initial number of groups;
determining a first Euclidian distance between the first AP and a first centroid of the first group and a second Euclidian distance between the first AP and a second centroid of a second group; and
assigning the first AP to the second group, based on the determined first Euclidian distance and the determined second Euclidian distance.

10. The method of claim 1, wherein clustering, based on the plurality of RF constellations and the estimated RF distances, the plurality of APs into a plurality of groups of one or more APs further comprises:
identifying a requirement related to a size of a first group of the plurality of groups; and
moving a first AP from the first group to a second group, of the plurality of groups, based on the identified requirement.

11. A system, comprising:
a processor; and
a memory storing a program, which, when executed on the processor, performs an operation, the operation comprising:
generating a plurality of RF constellations for a plurality of APs in a wireless network, the plurality of RF constellations organized based on estimated RF distances between the APs in the plurality of APs;
clustering, based on the plurality of RF constellations and the estimated RF distances, the plurality of APs into a plurality of groups of one or more APs; and
assigning each group, of the plurality of groups, to a wireless network controller.

12. The system of claim 11, wherein each RF constellation of the plurality of RF constellations comprises a plurality of sets of coordinates representing a position of each AP included in the respective RF constellation.

13. The system of claim 11, wherein generating the plurality of RF constellations further comprises:
estimating an RF distance between a first AP, of the plurality of APs, and a second AP, of the plurality of APs, based on an RF signal metric between the first AP and the second AP.

14. The system of claim 13, wherein generating the plurality of RF constellations further comprises:
locating the first AP relative to the second AP based on trilateration between the first AP, the second AP, and a third AP of the plurality of APs.

15. The system of claim 14, wherein trilateration between the first AP, the second AP, and the third AP further comprises:
mapping the first AP to an origin of a first RF constellation;
determining that a first RF signal metric between the first AP and the second AP is stronger than a second RF signal metric between the first AP and the third AP, and in response defining an x-axis of the first RF constellation using the second AP; and
positioning the third AP in the first RF constellation based on one or more distance estimates between the first AP and the third AP and between the second AP and the third AP.

16. The system of claim 11, wherein clustering, based on the plurality of RF constellations and the estimated RF distances, the plurality of APs into a plurality of groups of one or more APs further comprises:
determining an initial number of groups of APs;
assigning a first AP of the plurality of APs to a first group, of the initial number of groups;
determining a first Euclidian distance between the first AP and a first centroid of the first group and a second Euclidian distance between the first AP and a second centroid of a second group; and
assigning the first AP to the second group, based on the determined first Euclidian distance and the determined second Euclidian distance.

17. A computer program product for assigning APs to wireless network controllers, the computer program product comprising:
a computer-readable storage medium having computer-readable program code embodied therewith, the computer-readable program code executable by one or more computer processors to perform an operation, the operation comprising:
generating a plurality of RF constellations for a plurality of APs in a wireless network, the plurality of RF constellations organized based on estimated RF distances between the APs in the plurality of APs;

clustering, based on the plurality of RF constellations and the estimated RF distances, the plurality of APs into a plurality of groups of one or more APs; and assigning each group, of the plurality of groups, to a wireless network controller.

18. The computer program product of claim 17, wherein generating the plurality of RF constellations further comprises:

estimating an RF distance between a first AP, of the plurality of APs, and a second AP, of the plurality of APs, based on an RF signal metric between the first AP and the second AP.

19. The computer program product of claim 18, wherein generating the plurality of RF constellations further comprises:

locating the first AP relative to the second AP based on trilateration between the first AP, the second AP, and a third AP of the plurality of APs.

20. The computer program product of claim 17, wherein clustering, based on the plurality of RF constellations and the estimated RF distances, the plurality of APs into a plurality of groups of one or more APs further comprises:

determining an initial number of groups of APs;

assigning a first AP of the plurality of APs to a first group, of the initial number of groups;

determining a first Euclidian distance between the first AP and a first centroid of the first group and a second Euclidian distance between the first AP and a second centroid of a second group; and assigning the first AP to the second group, based on the determined first Euclidian distance and the determined second Euclidian distance.

* * * * *

UNITED STATES PATENT AND TRADEMARK OFFICE
CERTIFICATE OF CORRECTION

PATENT NO. : 10,887,822 B2
APPLICATION NO. : 16/136061
DATED : January 5, 2021
INVENTOR(S) : Jerome Henry et al.

Page 1 of 1

It is certified that error appears in the above-identified patent and that said Letters Patent is hereby corrected as shown below:

In the Specification

In Column 9, Line 19, delete "$\mu_c^{j)}$." and insert --$\mu_c^{(i)}$.--, therefor.

In Column 9, Line 24, delete "$\min_{c^{(i)}} \Sigma_{i=1}^{K} \|x^i - \mu_c^{(i)}\|^2$" and insert --$\min_{c^{(i)}} \Sigma_{i=1}^{K} \|x^i - \mu_{c^{(i)}}\|^2$--, therefor.

In Column 9, Line 26, delete "$\mu_c^i$," and insert --$\mu_c^{(i)}$,--, therefor.

In Column 9, Line 31, delete "$\min_\mu \Sigma_{i=1}^{k} \Sigma_{x \in c_j} \|x - \mu_i\|^2$" and insert --$\min_\mu \Sigma_{i=1}^{k} \Sigma_{x \in c_i} \|x - \mu_i\|^2$--, therefor.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*